United States Patent [19]

Hasan

[11] Patent Number: 4,885,590
[45] Date of Patent: Dec. 5, 1989

[54] BLIND SPEED ELIMINATION FOR DUAL DISPLACED PHASE CENTER ANTENNA RADAR PROCESSOR MOUNTED ON A MOVING PLATFORM

[75] Inventor: Moh'd A. Hasan, Cinnaminson Township, Burlington County, N.J.

[73] Assignee: General Electric Company, Moorestown, N.J.

[21] Appl. No.: 339,563

[22] Filed: Apr. 14, 1989

[51] Int. Cl.[4] ............................................. G01S 13/00
[52] U.S. Cl. ................................... 342/196; 342/160; 342/384
[58] Field of Search ................ 342/196, 160, 384, 381

[56] References Cited

U.S. PATENT DOCUMENTS 4,546,355 10/1985 Boles .

OTHER PUBLICATIONS

"An Extension To The Theory Of The Performance Of Airborne Moving-Target Indicators", by Urkowitz, pp. 210–214, of the IEEE Transactions on Aeronautical and Navigational Electronics, Dec., 1958.

"The Effect Of Antenna Patterns On The Performance of Dual-Antenna Radar Airborne Moving Target Indicators", by Urkowitz, pp. 218–223, of the IEEE Transactions On Aerospace and Navigational Electronics, Dec., 1964.

Primary Examiner—Theodore M. Blum
Attorney, Agent, or Firm—William H. Meise

[57] ABSTRACT

A radar system mounted on a moving vehicle uses a displaced phase center antanna (DPCA) and associated processing for taking the difference between the two signals received by the displaced antennas to provide moving target indication (MTI) by cancellation of the returns from stationary targets. The presence of moving targets is identified by threshold processing within discrete frequency bands. DPCA processing ordinarily results in amplitude nulls or "blind speeds" for targets moving at particular radial velocities. According to the invention, the two signals received by the displaced antennas are summed, weighted and divided into frequency bands which extend through the expected null region in a form of Doppler processing. Threshold processing is performed on DPCA processed signals within certain frequency bands outside of the null regions and on Doppler processed signals within other frequency bands, thereby substantially eliminating the blind speeds.

10 Claims, 6 Drawing Sheets

BLIND SPEED ELIMINATION FOR DUAL DISPLACED PHASE CENTER ANTENNA RADAR PROCESSOR MOUNTED ON A MOVING PLATFORM

The Government has rights in this invention pursuant to Contract No. F04701-87-C-0124.

BACKGROUND OF THE INVENTION

This invention relates to signal processors for eliminating certain blind speeds associated with radar moving target indication, also known as clutter cancellation, by the use of dual displaced phase center antenna (DPCA) processing. When radars are used for surveillance, it is desirable to reduce the workload imposed on the radar operator. For this purpose, it has long been the custom to provide moving target indication (MTI) to eliminate those radar returns from the display which represent non-moving or stationary targets, and to display only those returns which represent moving objects. In this way, only targets of importance are displayed. Such targets may include aircraft or missiles. In the case of a simple stationary surveillance radar, cancellation of stationary-target returns is readily accomplished by subtraction or combining with mutually inverse amplitude or phase the returns resulting from two successive transmitted pulses. Since the returns rom stationary targets remain the same from pulse to pulse, the subtraction cancels or eliminates those signals. Only those targets which have moved during the inter-pulse interval do not cancel completely, and result in a display.

Another method for detecting the presence of moving targets is to compare the returned signal from the target with a signal which is in frequency and phase coincidence with the transmitted pulse. This may be accomplished, for example, by applying the returned signal to a fast Fourier transformer for determining the frequency spectrum of the returned signal. The frequency spectrum of the signal returned from a moving target will include a Doppler frequency shift or component attributable to the motion of the target, whereas the returns from stationary targets will be at the transmitter frequency. Thus, a signal appearing at the output of a filter having a frequency other than the frequency of the transmitted pulse indicates the presence of a moving target, and in addition the magnitude of the frequency offset provides an indication of the radial velocity of the target.

When the surveillance radar system is mounted on a moving platform, the motion of the platform creates a Doppler shift of returns from stationary targets. FIG. 1 illustrates in perspective or isometric view an airplane 10 travelling in a +X direction, directing antenna beams 12 and 16 in two directions, either simultaneously or sequentially. A first beam 12 is directed in forward direction X and down toward the terrain. Even if the cross-section of the antenna beam is circular, its impingement on the terrain below can be represented as a roughly oval or elliptical region 14. If the axial cross-section of antenna beam 12 is elliptical, region 14 will be even more elongated. Second beam 16 is directed downward and in a lateral direction relative to direction of motion +X, and intercepts the terrain in a similar elongated region 18.

The aircraft motion creates Doppler frequency components which accompany the signal reflected or returned from each region 14 and 18. The Doppler components arise from the components of the relative velocity between the aircraft and the illuminated terrain which are directed along the aircraft-to-terrain axis, i.e., a line joining the aircraft and the particular point or the terrain causing the reflection. For this reason, the greatest Doppler frequency components arise from leading edge 20 of region 14. The Doppler components of the returned signal decrease in frequency as they approach trailing edge 22 of region 14. Because of the relatively large distance or angular separation between leading and lagging edges 20 and 22 of region 14, and for fast moving platform, the frequency spread of the Doppler components is relatively large. When beam 16 is directed exactly broadside to the direction of motion X, there is a center axis 28 of region 14 from which the returned signals have zero Doppler frequency component. The Doppler frequency spread for the lateral beam 16, which is due to the distance between leading point 24 and lagging point 26 of region 18 is the same as for the forward beam 12. The spread of frequencies in all directions depends upon the forward velocity of the vehicle and also upon the beamwidth of the antenna. Much of the terrain which is illuminated by the beam will result in a broad spread of frequencies which will compete with the Doppler frequencies of the targets of interest.

A system of transmitting frequency-jumped pulses can be used to cancel clutter in a radar system mounted on a moving vehicle, by compensating for the frequency spread in the forward direction and for relatively small angles on each side of the forward direction. For the side looking portions of the radar, the frequency jump system is less effective at clutter elimination.

In order to provide compensation for the Doppler spread in any direction from a moving vehicle, the signal processing system known as displaced phase center antenna (DPCA) was introduced. In DPCA, two antennas are used whose phase centers are separated in the direction of motion of the vehicle. The two antennas are coupled together for transmission to form a single transmitting antenna having a phase center centered between the phase centers of the individual antennas. After each pulse is transmitted, the two antennas are mutually separated for the receive mode of operation.

The returns from the target received by the two antennas in DPCA processing are individually processed by multiplying each of the returns by a weighting function for reducing the frequency spread attributable to the pulse nature of the transmission. The weighted signals representing returns from the target are each applied to a Fourier transform processor, in that the frequency components are sorted or divided into frequency components within predetermined frequency bands. A delay equal to the inter-pulse interval (the time between transmitted pulses) is introduced into one of the channels of received signals. Within each frequency band, the difference is taken between the signals in the two channels. This arrangement subtracts the signal received at one antenna from the signal received at the other antenna, with a delay. In effect, the returns resulting from two separate, sequential pulse transmissions are subtracted, with the lagging antenna occupying the location of the leading antenna for reception of the "delayed" return. For stationary terrain, the two signals which are subtracted are substantially identical whereby their subtraction results in cancellation. This compensates for or eliminates the vehicle motion on the returns from stationary targets. Returns from stationary targets are therefore suppressed. Moving targets appear as residual difference signals in one or more of the frequency bands. The presence of a moving target is identified by applying the difference signal in each frequency band to an individual threshold circuit which responds to a signal exceeding a threshold value. The particular frequency band within which a return is found establishes the radial velocity of the moving target.

FIG. 2 illustrates as a solid-line plot 30 the amplitude response in dB versus target range rate or radial velocity for a particular DPCA system. In FIG. 1, 0 dB represents maximum response. It can be seen that for target radial velocities or range rates of zero, the system has very low response. In addition, at a target range rate of approximately 400 knots there is a substantial null or decrease in the amplitude. Such nulls are known as "blind speeds". Although not illustrated in FIG. 2, similar decreases in amplitude occur periodically at velocities related to the pulse repetition interval:

$$V_B = \lambda/(2 \, PRI) \quad (1)$$

where $\lambda$ is the transmitted wavelength and PRI is the transmitted pulse recurrence interval.

It is clearly undesirable for a surveillance radar to have to have reduction in amplitude response for certain targets. In order to move the null illustrated in FIG. 1 to a higher velocity away from the target velocities of interest, it appears from equation (1) to only be necessary to decrease the pulse repetition interval (PRI) of the system.

The PRI in a DPCA system is selected to cause the phase center of the lagging antenna to move into the position of the leading antenna at the vehicle velocity. Two antennas 50 and 60 are located as illustrated in FIG. 3, moving to the left with vehicle velocity $V_s$. Each antenna has a length L in the direction of motion. Antenna 50 has a phase center 52 centrally located thereon, and antenna 60 likewise has a phase center 62. The distances from phase centers 52 and 62 to the leading and lagging edges of their respective antennas are equal to L/2. Lagging phase center 62 must move a distance (L/2) in order to assume the position previously occupied by the phase center of the transmit antenna, which lies midway between phase centers 52 and 62. In order for this to occur during one inter-pulse period PRI, $$PRI = L/(2V_s) \quad (2)$$

where L is the distance between phase centers. Consequently, lowering the PRI in order to raise the velocity at which the amplitude null of FIG. 2 occurs (the blind speed) requires decreasing the distance between phase centers, or increasing the vehicle velocity. For a given vehicle velocity, one way to decrease the distance between phase centers is by decreasing L which decreases the size of the antenna. However, this decreases its gain, which is undesirable. Alternatively, the antenna could be made as an array in which sections could be rendered inoperative so as to provide a full aperture L when desired but a reduced aperture when a blind speed increase was desired. But this is similar to reducing the aperture which is undesirable because of the reduction in gain. If it should be desired to increase the PRI without changing the total length of the antenna, the spacing between phase centers would have to increase by overlapping the apertures. Overlapping apertures requires complex feed and beamformer structures, and may be limited due to size and weight constraints. All of the above solutions are therefore undesirable, because of size and weight limitations associated with vehicles such as aircraft.

Improved processing is desired for reducing or eliminating the effects of amplitude nulls or blind speeds in the response of radar system without the bulk and complexity associated with the systems necessary to change the effective size or configuration of the antenna.

SUMMARY OF THE INVENTION

In a radar system which transmits pulses defining a pulse recurrence interval and at least one wavelength, a signal processing arrangement includes the processing step of multiplying first and second signals received by first and second antennas by a first weighting signal for reducing frequency sidelobes, to thereby produce first and second weighted signals. The first weighted signals are divided into frequency components lying within a plurality of predetermined first frequency bands, thereby producing first spectral band signals. The second weighted signals are divided into frequency components also lying within the plurality of predetermined first frequency bands to produce second spectral band signals which are relatively delayed relative to the first spectral band signals. The difference is taken between the delayed second spectral band signals and the first spectral band signals to produce MTI signals. The first and second signals received by the antennas are also summed to produce sum signals, and the sum signals are multiplied by the second weighting signal to produce third weighted signals. The third weighted signals are divided into frequency components lying within predetermined second frequency bands to produce sum signals. Most of the second frequency bands are higher in frequency than the highest of the first frequency bands. In a particular embodiment of the invention, the MTI and sum signals are compared to determine the largest amplitude.

DESCRIPTION OF THE INVENTION

Figure 3:
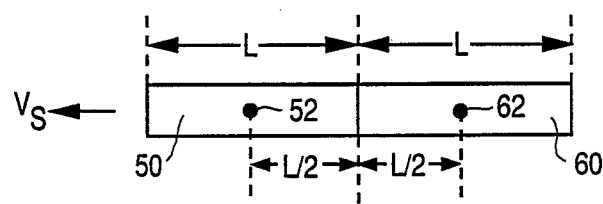
FIG. 3 is a simplified block diagram of a displaced phase center antenna (DPCA) configuration.
Figure 4:
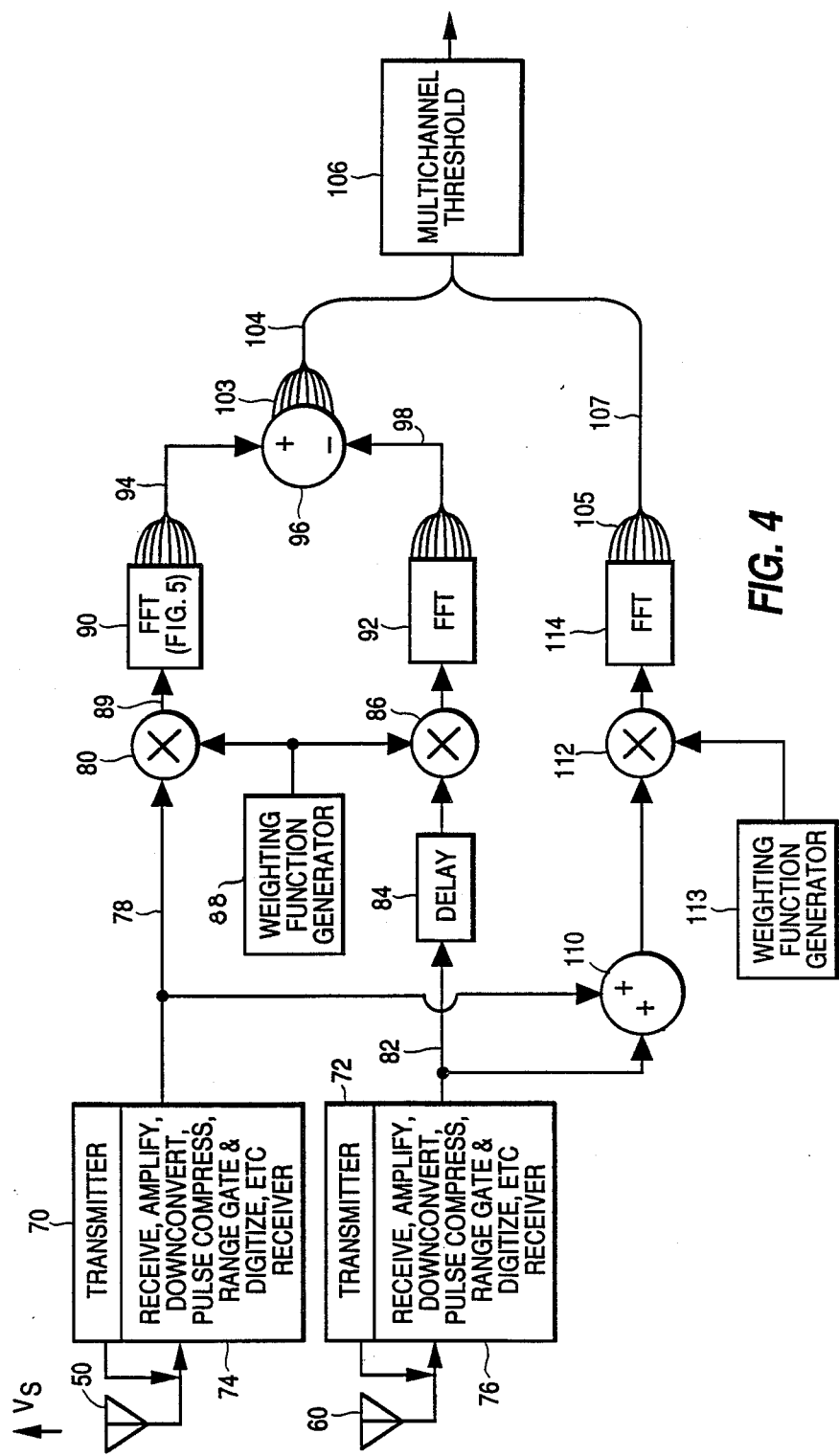
FIG. 4 is a simplified block diagram of a radar system embodying the invention.

FIG. 4 is a simplified block diagram of a radar system in accordance with the invention. Elements of FIG. 4 corresponding to those of FIG. 3 are designated by the same reference numerals. In FIG. 4, antenna 50 is connected to various signal combiners, transmit-receive (TR) switches or diplexers, and a transmitter illustrated together as a block 70, and antenna 60 is similarly connected to a transmitter 72 interconnected with transmitter 70 for periodically interconnecting antennas 50 and 60 to form a single transmitting aperture and for transmitting Barker-coded pulses of radio-frequency signals defining at least one wavelength. Immediately following each transmission, antennas 50 and 60 are separated to form two separate receiving apertures. Antenna 50 in its receive mode is coupled to signal combiners, amplifiers, down converters, Barker-code pulse compression filters, range gates and digitizers and other standard processing, all illustrated together as a receiver block 74. If the returns are demodulated in I and Q form, the square root of the sum of their squares is taken to produce an amplitude signal. Antenna 60 is connected to a receiver block 76 corresponding to block 74.

Figure 8:
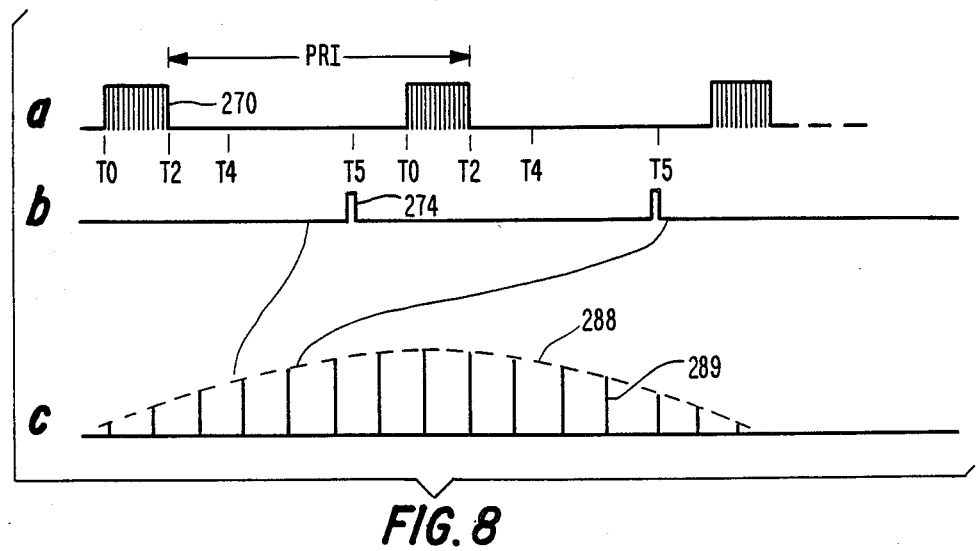
FIGS. 8a–8c, referred to jointly as FIG. 8, illustrate certain signal amplitude or state versus time waveforms useful in understanding the operation of the arrangement of FIG. 4.

FIG. 8a illustrates a pulse waveform 270 representing transmitted Barber-coded pulses. Such pulses may be processed after reception to provide time compression, which improves the range resolution of the radar system. A complete Barker coded transmitted pulse is recurrently transmitted in the interval T0–T2, with a recurrence interval PRI, as illustrated in FIG. 8a. Immediately after each pulse is transmitted, the receiver may start listening for a return. In order to obtain a complete Barker code in the return signal, the receiver must listen for a time equal to the interval T0–T2. Such an interval ends at a recurrent time illustrated as T4. At T4, therefore, fully compressed return pulses may begin to be received. Such compressed pulses may be only a few microseconds wide, or less, and represent a range resolution of less than a thousand meters.

In order to identify the range of a target, receivers 74 and 76 follow the pulse compression function with a range gating function, which gates to the output of the receiver only those returns from one discrete range. For example, in FIG. 8b, pulses 274 represent a range gate occurring within receivers 74 and 76 at a recurrent time T5 after the transmission of each pulse 270. The velocity of electromagnetic signal propagation is such that it takes 12.4 microseconds ($\mu$S) per nautical mile of range between the radar antenna and the target for the signal to reach the target and return. Thus, the time T5 at which range gate 274 occurs represents a predetermined range, and its width is selected to pass the signals within the resolution established by the Barker compression, which is a function of the receiver bandwidth.

The outputs of receiver blocks 74 and 76 are digital signals representing a stream of samples of the returned signal at the range selected by the range gate. Those skilled in the art know that such digital signals may be either in the form of a plurality of simultaneously occurring signals appearing simultaneously on a plurality of conductors (parallel data), or a plurality of sequential signals appearing sequentially on a single conductor set (serial data). For simplicity, conductor sets are described as conductors. The signals appearing at the output of receiver 74 are applied by way of a conductor 78 to a multiplier 80. The signals produced at the output of receiver 76 are applied by way of a conductor 82 and a delay represented as a block 84 to a second multiplier 86. Block 84 provides delay equal to one pulse repetition interval (PRI) illustrated in FIG. 8a. Multipliers 80 and 86 each receive a weighting signal from a weighting function generator 88, e.g. Hamming weighting. The weighting is used to reduce the effect of sidelobes. The weighting signal produced by generator 88 is supplied to multipliers 80 and 86 simultaneously with the range-gated returned signals. As a result of the delay introduced by block 84, the range-gated returned signals applied to multipliers 80 and 86 are derived from different, sequential transmitter pulses. In FIG. 8c, dash-line curve 288 illustrates the value of the weighting function, which changes over a period of many pulse repetition intervals. Lines 289 represent the normalized result of multiplying many of the range-gated return signals by weighting function 288. The weighting prevents the generation of spurious frequency components in later processing which are attributable to the pulsatory nature of the return signals. The multiplied signals are applied from multiplier 80 of FIG. 4 over a conductor 89 to a fast Fourier transform (FFT) circuit illustrated as a block 90. Similarly, the weighted signals from multiplier 86 are applied to a fast Fourier transform processor illustrated as a block 92. The Fourier transformation blocks may be considered to be integrators which enhance those signals having a nonrandom structure, i.e., "real" targets.

Figure 5:
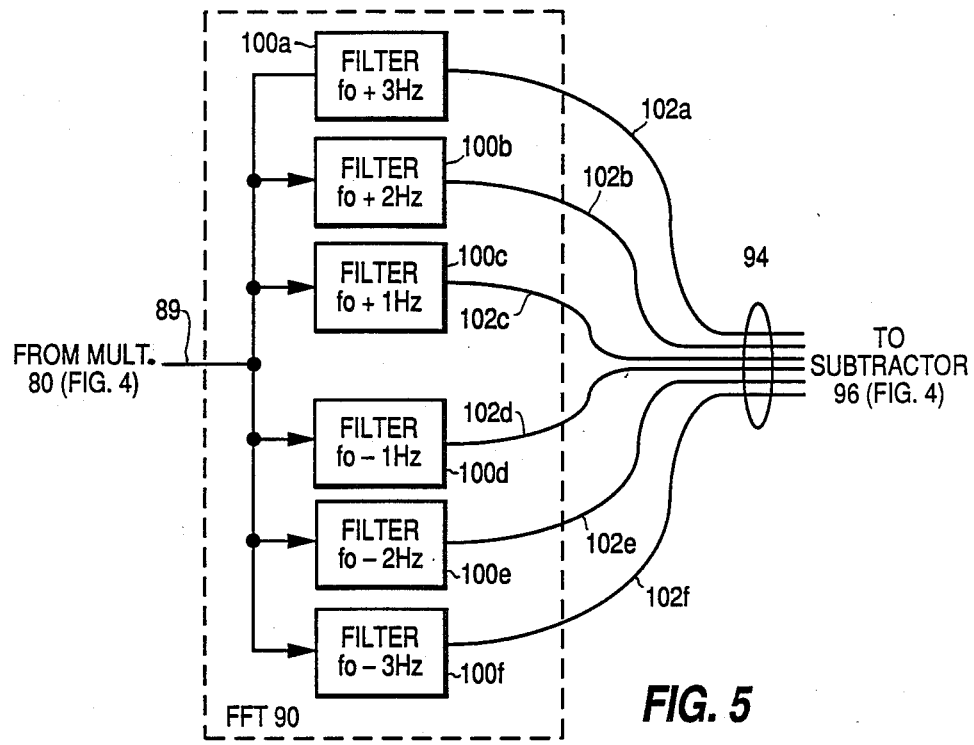
FIG. 5 is a simplified block diagram of a portion of the arrangement of FIG. 4, as an aid to understanding the operation.

The signal processing provided by a block 90 may be a software-controlled circuit performing fast Fourier transforms, but may be easier to understand in hardware form as being a bank of filters, each tuned to a narrow frequency band a few Hertz (Hz) wide, centered around a frequency established by the transmitter wavelength. Referring to FIG. 5, the signal arriving at FFT 90 over conductor 89 is applied simultaneously to a bank of filters 100a–100f, where the hyphen represents the word "through". Each filter 100 is a bandpass filter tuned to a slightly different frequency relative to a center frequency represented as $f_o$, which represents the down-converted transmitter frequency. Ideally, a moving target will generate a single well-defined Doppler frequency, which adds to the terrain-generated Doppler signal spread. All of the filters 100 produce signals on their associated output conductors 102, because of the terrain-generated Doppler signals. That one of filters 100 which also contains the Doppler components associated with the moving target produces on its output conductor 102 a combined Doppler signal. Conductors 102a, 102b . . . 102f are combined into a bundle of conductors 94. The output of each filter 100 may be thought of as being in a frequency band or "channel".

The output of FFT 90 of FIG. 5 is applied over conductor 94 to the noninverting input of a multichannel subtractor or differencing circuit illustrated as 96. The weighted signal from the output of multiplier 86 is applied through FFT 92, which is similar to FFT 90, and the resulting signals are applied over a bundle of conductors 98 to the inverting input terminal of subtracting circuit 96. Subtracting circuit 96 includes a plurality of subtractors, one for each frequency band of the FFT processors 90, 92. Each individual subtractor of subtracting circuit 96 (one for each frequency band) is coupled to an individual output conductor 103 of subtracting circuit 96. The many individual output conductors 103 of subtracting circuit 96 are gathered into a bundle 104. In the simple case where there are no moving targets in the vicinity and under ideal circumstances, the moving vehicle produces Doppler components associated with each transmitter pulse, and the Doppler components remain the same from pulse to pulse. Consequently, the signal produced by each individual filter within FFT 90 is equal to the signal produced at the output of the corresponding filter of FFT 92. When the signals in these two filters are subtracted by the subtractor within subtracting circuit 96, the net output signal is zero. Consequently, the ideal normal condition of the signal at the output of subtracting circuit 96 in the absence of a moving target is zero signal. The signals on the conductors of output bundle 104 are applied to a multichannel threshold circuit illustrated as a block 106. Within block 106, each separate conductor of bundle 104 is applied to its own individual threshold circuit for comparing the signal within that frequency range with a value which may be fixed or may change from moment to moment depending upon the precise nature of the processing. An excursion of the residue signal on a conductor of bundle 104 indicates that the subtraction by subtracting circuit 96 is incomplete, which suggests that the target return has changed within the interpulse period. If the signal is large enough, it is assumed to indicate the presence of a moving target, and is further processed for display to an operator. The range of the target is known because of the range gating performed in association with receivers 74 and 76, and the radial velocity of the target may be determined by other processing arrangements (not illustrated) which depends upon the particular filter 100 of the FFT's which respond to the return.

It should be noted that, in order to cause the returns from two sequential pulses to be subtracted in subtraction circuit 96, delay 84 can in principle be anywhere in the signal path between receiver 76 and the inverting input terminal of subtracting circuit 96. The illustrated position is convenient, since it allows the same weighting function to be applied to signals in both channels.

Figure 1:
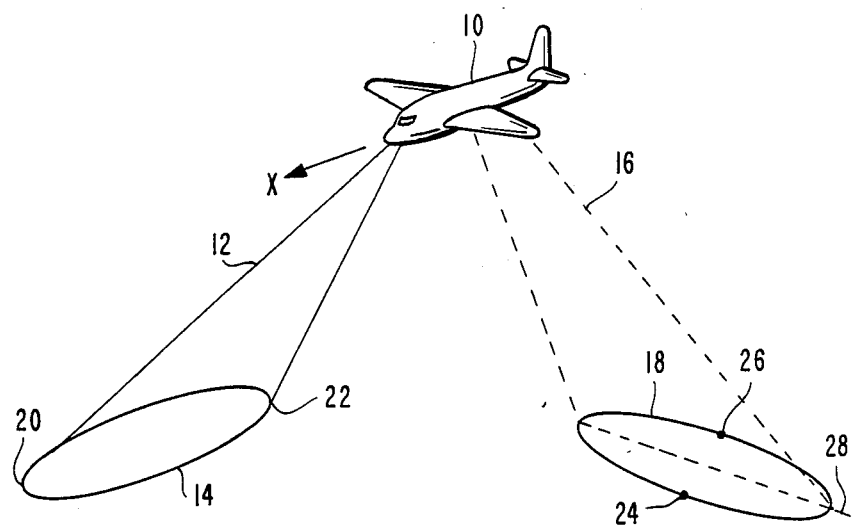
FIG. 1 is a pictorial representation of an airplane flying over terrain which is illuminated by antenna beams.
Figure 2:
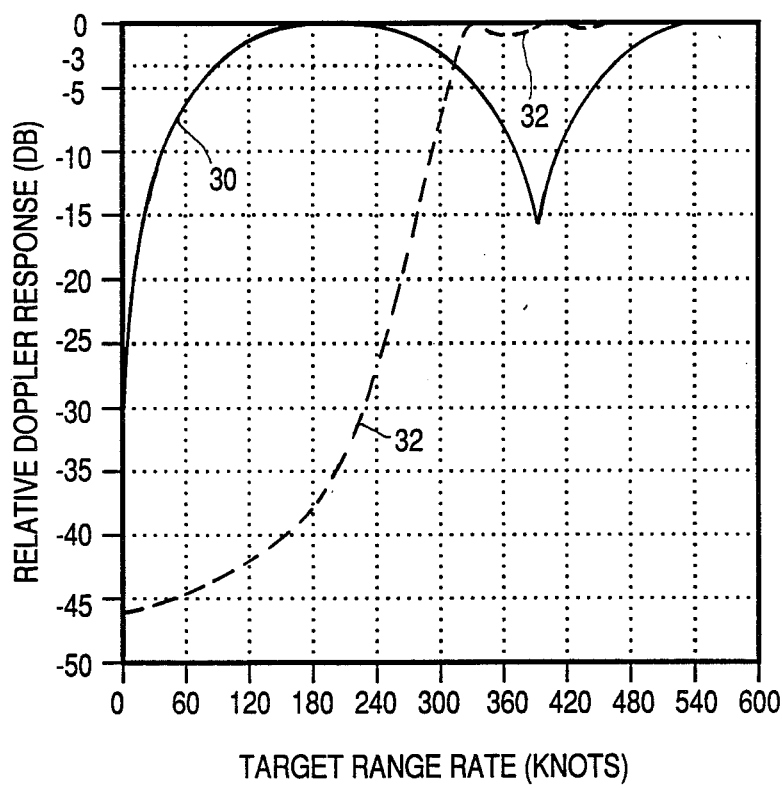
FIG. 2 is a plot of amplitude response versus target radial velocity, illustrating a null which represents a blind speed.

As so far described, the arrangement of FIG. 4 corresponds substantially with conventional DPCA processing, and is subject to blind speeds as discussed in relation to FIG. 2.

Figure 6:
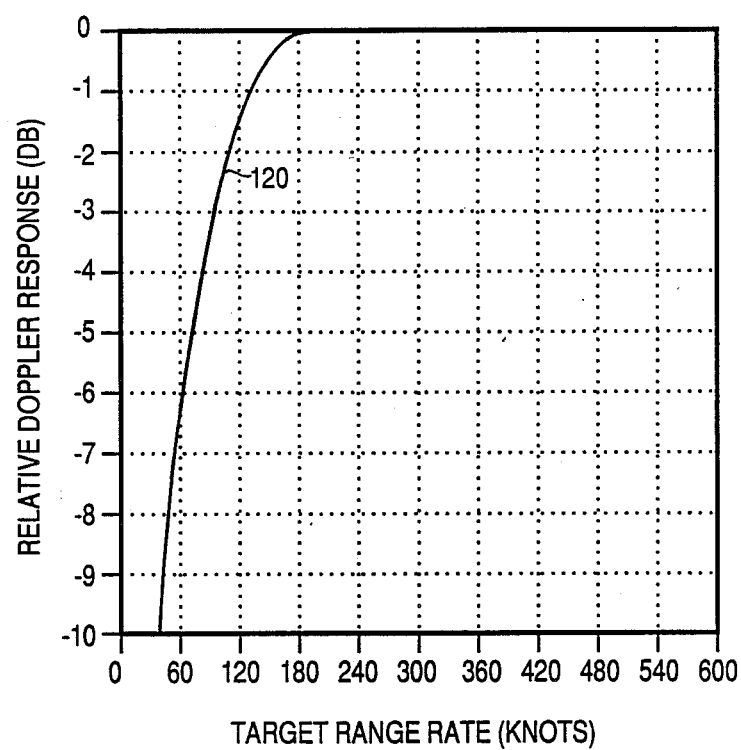
FIG. 6 is a plot of the amplitude response versus target radial velocity for the arrangement of FIG. 4.

In accordance with the invention, the signals generated by receivers 74 and 76 on conductors 78 and 82, respectively, are applied to a summing circuit illustrated as 110. Summing circuit 110 produces a sum signal which is applied to a multiplier 112, where the sum signals are multiplied by a weighting signal, which is different from the previous weights 80 and 86 because the clutter power level in the sum signal is much higher than that in the DPCA output channel and heavier weighting will be required. The weights will be produced by a weighting function generator 114. The weighted signals produced at the output of multiplier 112 are applied to a further FFT processor 114, which is similar in form to FFT processors 90 and 92. In general, the frequency bands where targets can be detected, of the filters associated with FFT processor 114 are higher in frequency than those of FFT processors 90 and 92. Referring to FIG. 2, the filters of FFT's 90 and 92 are selected to correspond to Doppler frequencies generated by targets with range rates of about 70 to 300 knots (the −3 dB points of amplitude plot 30 of FIG. 2), and the filters of FFT 114 are selected to correspond to Doppler frequencies of targets having range rates above about 300 knots. The output of FFT 114 is applied to further individual threshold circuits of multichannel threshold circuit arrangement 106. Thus, multichannel threshold 106 receives DPCA-processed signals over a frequency range extending from the useful lower end of velocities discernible by DPCA processing (−3dB at 70 knots in this example) to the velocity corresponding to the same amount of amplitude reduction at the first null (−3 dB at 300 knots), and above that velocity receives signals which are processed by Doppler filters. Because the clutter level may be different in the outputs 104 and 107, the threshold function will be different but can be carried out by the same processor, e.g., a constant false alarm rate (CFAR) detector. The response of the Doppler filter processing by summers 110, multiplier 112 and FFT 114 is illustrated as plot 32 of FIG. 2. The result of combined processing is illustrated as plot 120 of FIG. 6.

It may be desirable to vary the PRF slightly to compensate for changes in the velocity of the vehicle carrying the radar system, eliminate range eclipsing, and solve ambiguities if they exist. This would result in changes in the amplitude responses illustrated by plots 30 and 32 in FIG. 2. Consequently, the −3 dB crossover point at 300 knots would move. As a result of movement of the amplitude null resulting from changes in PRF to compensate for changes in vehicle velocity, allocation of filters as described in conjunction with FIG. 4 may result in reduction of the response in the DPCA-processed signals below the response of the Doppler-filter processed signals, or vice versa.

Figure 7:
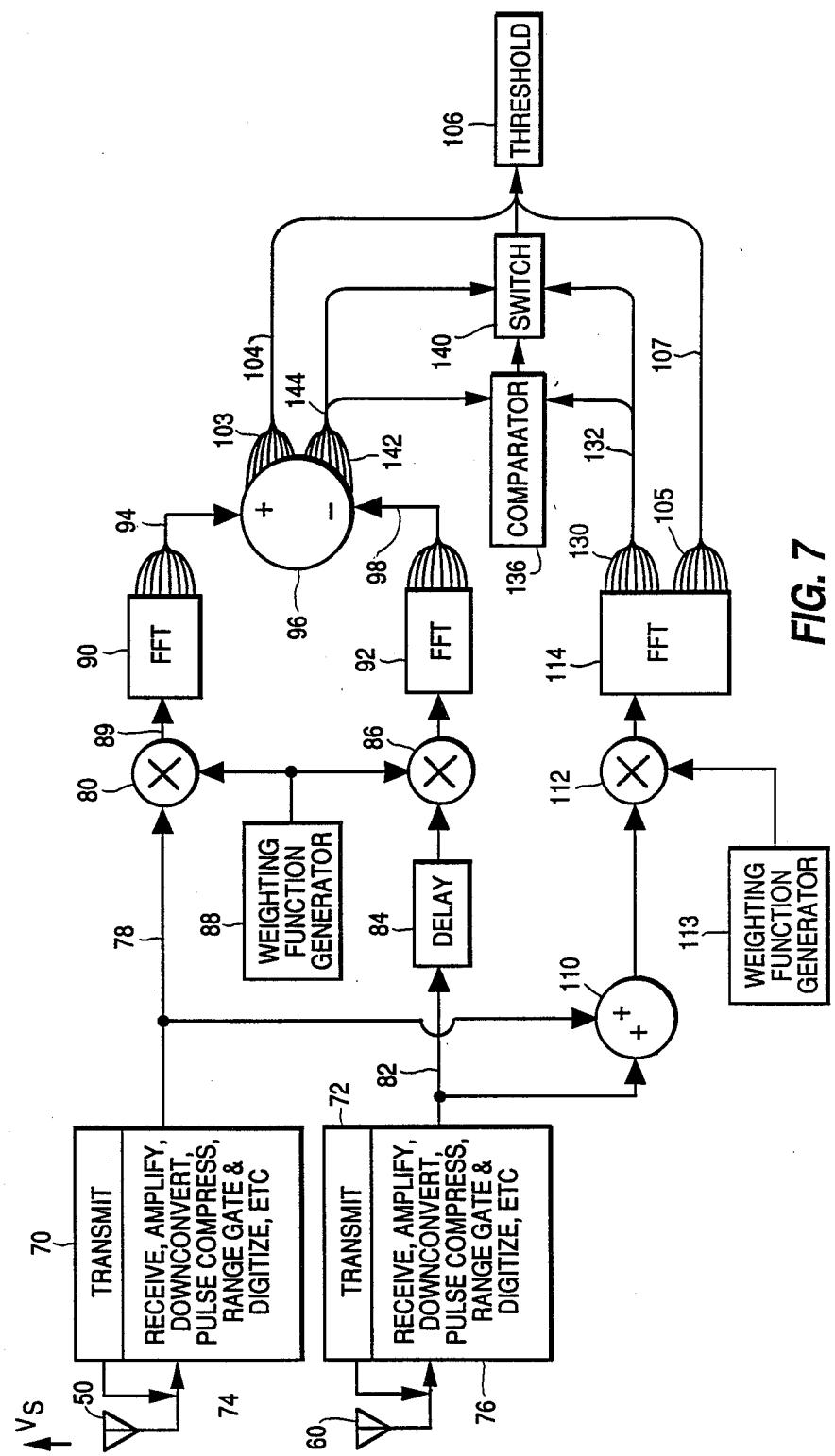
FIG. 7 is a simplified block diagram similar to FIG. 4, and including additional arrangements for selecting the best of plural signals representing the same information.

The problem of changes in relative response may be corrected by processing as described in conjunction with FIG. 7. Elements of FIG. 7 corresponding to those of FIG. 4 are designated by the same reference numerals. In general, the arrangement of FIG. 7 has multiple filters with contiguous frequency bands extending over a first lower frequency band in which it is expected that DPCA processing will always be most advantageous, and multiple filters with contiguous frequency bands extending over a second, higher, frequency band in which it is expected that Doppler filter processing will always be most advantageous. In a third frequency band in which it is expected that the best response will move from one form of processing to the other from time to time, one or more pairs of filters at the same frequency are provided in both forms of processing, their outputs are compared, and the largest-amplitude response is selected for further processing.

In FIG. 7, the output frequency bands or channels from FFT processors 90 and 92 are subtracted in subtracting circuit 96, as in FIG. 4. The difference signals are segregated into two groups on conductors 103 and 142, respectively. The group of signals on conductors 103 lies within the first frequency band in which DPCA processing is always better than Doppler filter processing. The first frequency band might correspond to range rates of, for example, 70 to 240 knots in plot 30 of FIG. 2. The signals on conductors 103 are grouped into bundle 104 and supplied to individual portions of threshold circuit 106. The group of signals on conductors 142 lies within those frequency bands in which Doppler filter processing may sometimes be better than DPCA processing. The signals on conductors 142 are grouped into a bundle 144, which is distributed to a comparator 136 and to a switch 140. Similarly, the output of FFT processor 114 consists of a plurality of frequency bands. These are segregated into two groups on conductors 105 and 130. The signals on conductor 105 are at frequencies in the second frequency band, those in which Doppler filter processing is always better than DPCA processing. Conductors on sets 105 are grouped into a bundle 107 and coupled to threshold circuit 106. The signals on conductors 130 lie within the third frequency band in which DPCA. processing is sometimes better. These are grouped into a bundle 132 and applied to comparator 136 and to switch 140.

Comparator 136 of FIG. 7 within each individual frequency band compares the signal amplitudes of the signals received from subtracting circuit 96 and FFT processor 114, and produces control signals for controlling the positions assumed by the contacts of switch 140. Switch 140 is made to switch to select the larger-amplitude signal. Switch 140 then routes the larger-amplitude signal to threshold circuit 106. In this way, threshold circuit 106 receives DPCA-processed signals within certain (the first) frequency bands, Doppler-filtered signals within other higher (the second) frequency bands, and at certain mid-frequency (the third) bands, receives those of the DPCA-or Doppler-filtered signals which are greater in amplitude.

Other embodiments of the invention will be apparent to those skilled in the art. For example, while one advantage of the inventive system is that it provides additional design freedom or improved performance without the requirement for changing antenna aperture size or configuration, the invention may be used, if desired, in conjunction with an antenna whose aperture size or configuration can be changed in order to provide maximum performance.

What is claimed is:

1. A method for processing first and second signals, defining at least one wavelength and received at different times by first and second mutually displaced antennas carried on a vehicle movable relative to terrain, said first and second signals together defining a pulse recurrence interval, which signals include components representing returns from said terrain which are modified by Doppler components resulting from motion of said vehicle, comprising the steps of:
   multiplying each of said first and second signals by a first weighting signal for reducing frequency sidelobes attributable to the pulsatory return of said first and second signals to produce first and second weighted signals;
   dividing said first weighted signals into frequency components lying within a plurality of predetermined first frequency bands to produce first spectral band signals;
   dividing said second weighted signals into frequency components lying within said plurality of predetermined first frequency bands to produce delayed second spectral band signals which are delayed relative to said first spectral band signals;
   taking the difference between said first spectral band signals and said delayed second spectral band signals to produce MTI signals, in which the effects of said motion of said vehicle on said returns from said terrain are reduced to thereby relatively enhance returns from moving targets, but reducing the effective amplitude of said returns from those of said moving targets having radial velocities within certain limits;
   summing said first and second signals to produce second sum signals;
   multiplying said second sum signals by second weighting signals for reducing frequency sidelobes attributable to the pulsatory nature of said first and second signals, thereby producing third weighted signals; and
   dividing said third weighted signals into frequency components lying within predetermined second frequency bands, at least most of which are higher in frequency than the highest of said predetermined first frequency bands.

2. A method according to claim 1 further comprising the steps of comparing the amplitude of said MTI signals and said second sum signals to determine the largest.

3. A method according to claim 1 further comprising the steps of:
   comparing the amplitudes of said MTI signals and said second sum signals within any of said predetermined frequency bands which overlap; and
   in each of said predetermined frequency bands which overlap, selecting that one of said MTI signals and said second sum signals which has the greatest amplitude to produce a selected signal.

4. A method according to claim 3, comprising the further step of:
   combining (a) said MTI signals lying within those of said plurality of predetermined first frequency bands which do not overlap with said plurality of predetermined second frequency bands with (b) said second sum signals lying within those of said predetermined second frequency bands which do not overlap with said predetermined first frequency bands, and (c) within each of said predetermined first frequency bands which overlaps with at least one of said predetermined second frequency bands, that one of said MTI signals and said second sum signals which is said selected signal.

5. A radar system signal processor for processing first and second received signals derived from first and second mutually displaced antennas operating at least one wavelength and carried on a vehicle movable relative to terrain, said received signals being pulsed signals defining a pulse recurrence interval, which signals are corrupted by Doppler components of motion, comprising:
   a source of first weighting signal selected for reducing frequency domain sidelobes when multiplied by a pulse return;
   first multiplier means coupled to said source of first weighting signals, said first multiplier means including an input terminal and an output terminal, said first multiplier means being adapted for multiplying signal applied to its said input terminal by said first weighting signal;
   second multiplier means coupled to said source of first weighting signals, said second multiplier means including an input terminal and output terminal, said second multiplier means being adapted for multiplying signal applied to its said input terminal by said first weighting signal;
   first coupling means coupled to said input port of said first multiplier means and adapted to be coupled for receiving said first received signals for coupling said first received signals to said input port of said first multiplier means with a reference delay, whereby said first multiplier means produces weighted first signals at its said output port;
   second coupling means coupled to said input port of said second multiplier means and adapted to be coupled for receiving said second received signals for coupling said second received signals to said input port of said second multiplier means with a second delay differing from said reference delay by an amount related to said pulse recurrence interval, whereby said second multiplier means produces weighted second signals at its said output port;

first transform means coupled to said output port of said first multiplier means for dividing said weighted first signal into a plurality of spectral component bands to produce first spectral signal components extending over a predetermined frequency range;

second transform means coupled to said output port of said second multiplier means for dividing said weighted second signal into a like plurality of spectral component bands to produce second spectral signal components extending over said predetermined frequency range;

subtracting means coupled to said first and second transform means for taking the difference of said first and second spectral signal components, whereby said first and second spectral signal components arising from said terrain tend to cancel, thereby leaving spectral signal components relating principally to targets having finite radial velocities relative to said vehicle, which finite radial velocities do not include certain velocity values related to the quotient of a product divided by the length of said first and second antennas in the direction of the velocity of said vehicle, where said product is the product of said wavelength multiplied by said velocity of said vehicle;

summing means adapted to receive said first and second received signals, for producing a sum signal;

a source of second weighting signals;

third multiplying means coupled to said source of second weighting signals and to said summing means for multiplying said sum signal by said second weighting signal for producing weighted sum signals; and third transform means coupled to said third multiplying means for dividing said weighted sum signal into a plurality of spectral components having a second range of frequencies generally higher than said predetermined frequency range.

6. A system according to claim 5 wherein said first and second Fourier transform means each include a bank including a first plurality of mutually parallel filters, each filter except the end filters of each bank having a frequency bandwidth contiguous with the frequency bandwidths of the next adjacent filters.

7. A system according to claim 5 wherein said second delay equals an integer multiple of said pulse recurrence interval.

8. A system according to claim 5 wherein the maximum pulse recurrence interval, without overlapping of the apertures of said first and second antennas, equals the quotient of half the distance between said phase centers divided by said velocity of said vehicle.

9. A system according to claim 5 wherein said first predetermined frequency range extends from a first frequency range to a second frequency range, and said second range of frequencies extends from a third frequency contiguous with said second frequency to a fourth frequency higher than said third frequency.

10. A system according to claim 5 further comprising non-additive mixing means coupled to said subtracting means and to said third transform means for, within that range of frequencies in which said predetermined frequency range and said second range of frequencies are contiguous, comparing the magnitude of said spectral components produced at the outputs of said subtracting means and said third transform means for selecting the larger.

* * * * *